(12) United States Patent
Rusch et al.

(10) Patent No.: US 12,162,327 B2
(45) Date of Patent: Dec. 10, 2024

(54) PENDULUM ROCKER DAMPER WITH A ROTATION AXIS

(71) Applicant: Schaeffler Technologies AG & Co. KG, Herzogenaurach (DE)

(72) Inventors: Alain Rusch, Gambsheim (FR); Martin Häßler, Graben-Neudorf (DE); Michael Kessler, Bühl (DE); Olaf Werner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/275,649

(22) PCT Filed: Jan. 18, 2022

(86) PCT No.: PCT/DE2022/100046
§ 371 (c)(1),
(2) Date: Aug. 3, 2023

(87) PCT Pub. No.: WO2022/171231
PCT Pub. Date: Aug. 18, 2022

(65) Prior Publication Data
US 2024/0109392 A1    Apr. 4, 2024

(30) Foreign Application Priority Data
Feb. 9, 2021    (DE) .................. 10 2021 102 931.7

(51) Int. Cl.
| B60G 21/055 | (2006.01) |
| F16D 3/12 | (2006.01) |
| F16F 15/12 | (2006.01) |

(52) U.S. Cl.
CPC ............ B60G 21/055 (2013.01); F16D 3/12 (2013.01); F16F 15/1205 (2013.01);
(Continued)

(58) Field of Classification Search
CPC ............ B60G 21/055; B60G 21/0555; B60G 2202/135; B60G 2206/427;
(Continued)

(56) References Cited

U.S. PATENT DOCUMENTS

| 2018/0272822 A1 | 9/2018 | Holzberger et al. |
| 2020/0124107 A1* | 4/2020 | Häßler ............... F16F 15/1204 |

FOREIGN PATENT DOCUMENTS

| DE | 102013002714 A1 | 8/2014 |
| DE | 102013225978 A1 | 6/2015 |

(Continued)

*Primary Examiner* — Keith J Frisby

(57) ABSTRACT

A pendulum rocker damper with a rotation axis includes an input side with first and second input-side counter tracks, an output side with first and second output-side counter tracks, a stored energy source, and rocker elements disposed at opposite axial ends of the stored energy source. Each of the rocker elements has three axially offset partial tracks forming an input-side roller track and an output-side roller track. A first input-side rolling element is clamped between the first input-side counter track and a first input-side roller track and a second input-side rolling element is clamped between the second input-side counter track and a second input-side roller track. A first output-side rolling element is clamped between the first output-side counter track and a second output-side roller track and a second output-side rolling element is clamped between the second output-side counter track and a second output-side roller track.

19 Claims, 3 Drawing Sheets

(52) U.S. Cl.
CPC .................. *B60G 2202/135* (2013.01); *B60G 2204/4191* (2013.01); *B60G 2206/427* (2013.01); *Y10T 74/2128* (2015.01)

(58) Field of Classification Search
CPC .......... B60G 2204/4191; F16F 15/1204; F16F 15/1205; F16F 15/12; F16F 15/123; F16F 15/1232; F16F 15/12326; F16F 15/12333; F16F 15/134; F16F 15/1343; F16F 15/13438; F16F 15/13446; F16F 2230/0064; F16D 3/12; F16D 2300/22; Y10T 74/2128
USPC ........................................ 280/124.1; 267/136
See application file for complete search history.

(56) References Cited

FOREIGN PATENT DOCUMENTS

| | | | |
|---|---|---|---|
| DE | 102015220173 A1 | | 5/2016 |
| DE | 102015203054 A1 | | 8/2016 |
| DE | 102015203082 A1 | | 8/2016 |
| DE | 102015209885 A1 | | 12/2016 |
| DE | 102015211899 A1 | * | 12/2016 |
| DE | 102018108049 A1 | | 10/2019 |
| DE | 102018108441 A1 | | 10/2019 |
| DE | 102019121204 A1 | | 8/2020 |
| DE | 102019121205 A1 | | 8/2020 |
| DE | 102019118971 A1 | | 1/2021 |
| EP | 2011674 A1 | | 1/2009 |
| KR | 20150018987 A | | 2/2015 |
| WO | 2016078656 A1 | | 5/2016 |

\* cited by examiner

PENDULUM ROCKER DAMPER WITH A ROTATION AXIS

CROSS-REFERENCE TO RELATED APPLICATIONS

This application is the United States National Phase of PCT Appln. No. PCT/DE2022/100046 filed Jan. 18, 2022, which claims priority to German Application No. DE102021102931.7 filed Feb. 9, 2021, the entire disclosures of which are incorporated by reference herein.

TECHNICAL FIELD

The present disclosure relates to a pendulum rocker damper with a rotation axis.

BACKGROUND

So-called pendulum rocker dampers are already known from the prior art. For example, concepts are known from DE 10 2019 121 204 A1 and DE 10 2019 121 205 A1 for modulating the rigidity of a rotating shaft or a rotating shaft system in a drive train. These pendulum rocker dampers comprise an input side and an output side which are connected to one another (in both directions) in a torque-transferring manner. Interposed are a plurality of rocker elements (also referred to as rockers) and a plurality of spring elements. The rocker elements are supported in a relatively displaceable manner by means of at least one rolling element on the input side and/or on the output side. The rolling elements are clamped by means of the spring elements so that they can roll between the respective transmission track and the complementary counter track. The relative torsion angle between the input side and the output side is converted into a spring deflection of the spring elements by means of this pendulum rocker damper. By means of the transmission tracks and the complementary counter tracks, which form a ramp gear, a transmission ratio can be adjusted and the rigidity of the pendulum rocker damper can thus be adjusted. It is also advantageous here that the transmission ratio need not be constant, but rather the gradient of the ramp gear can be variably adjusted via the torsion angle of the input side to the output side. A further advantage of such a pendulum rocker damper compared to other embodiments is that the pendulum rocker damper has (almost) no hysteresis properties, especially at the zero crossing. The known pendulum rocker dampers require a large amount of installation space and are designed to reduce the rigidity of the rotating shaft.

Furthermore, what are termed roll stabilizers are known from the prior art, by means of which the spring behavior of a wheel of a two-wheeled vehicle axle is copied to the respective other wheel. For example, when cornering, the roll rate of the vehicle body is reduced to the outside of the curve. To prevent mimicking of the other wheel when driving through a pothole, for example, active roll stabilizers are increasingly being used. These comprise an actuator and a damper device. The damper device is set up to decouple short-term (vertical) deflections of a wheel (such as they occur in the case of a pothole) from a transfer and/or to delay a torque impact to protect the components. Damper devices with an elastomer are currently used as the damping body. These are subject to very high loads with torques of, for example, 1.5 kNm [one and a half kilonewton meters]. Furthermore, it is difficult to set the transfer characteristic of such a damper device in a process-reliable manner, and signs of aging occur in the elastomer body over its service life. Such damper devices with an elastomer as the damping body have the great advantage that they are very compact.

SUMMARY

The present disclosure relates to a pendulum rocker damper with a rotation axis including an input side, an output side, a stored energy source for transferring a torque between the input side and the output side, a plurality of rocker elements with an input-side roller track and an output-side roller track, and a number of rolling elements corresponding to the number of roller tracks of the rocker elements. The input side has one input-side counter track each corresponding to a respective one of the input-side roller tracks, between which one input-side rolling element each is clamped rollably by means of the stored energy source. The output side has one output-side counter track each corresponding to a respective one of the output-side roller tracks, between which one output-side rolling element each is clamped rollably by means of the stored energy source.

The rocker elements each have three separate partial tracks which are arranged to be axially offset relative to one another and from which the roller tracks are formed.

Unless explicitly stated otherwise, reference is made to the stated rotation axis when the terms "center", "axial direction", "radial direction", or "circumferential direction" as well as corresponding terms are used in the following. Unless explicitly stated otherwise, ordinal numbers used in the preceding and subsequent description are used only for the purposes of clear distinction and do not indicate an order or a ranking of designated components. An ordinal number greater than one does not necessarily mean that another such a component must be present.

The pendulum rocker damper proposed here is compact because the arrangement of the roller tracks, i.e., both the input-side roller tracks and the output-side roller tracks, enables a compact design on the respective rocker element. The rolling elements can be arranged to be close together in their running direction (corresponding to the rocking movement of the relevant rocker element) as a result of the arrangement axially adjacent to one another. The running direction is the movement of the rolling axes of the rolling elements during a rocking movement of the concerned rocker element. In one embodiment, the rolling axes of the rolling elements of a rocker element are arranged at the same height relative to the stored energy source when the rocker element is in a rest position, e.g., in such a way that this alone creates a balance of forces over the rolling elements, the rocker elements, and the sides with the same geometry of the roller tracks. In an example embodiment, both the input side and the output side are arranged to be radially on the outside. The central installation space is thus occupied solely by the rocker elements and the stored energy source. It should be pointed out at this point that the stored energy source includes one or a plurality of elements which (at least in combination) are designed to absorb a force and to output this force (almost) without loss. Such an element is, for example, a helical spring, a solid spring, a gas pressure accumulator or a block of material exhibiting rubber-elastic behavior. The force retained by the stored energy source may be provided as a compressive force.

The counter tracks of the input side and output side accordingly point radially inward, so that the rolling elements are arranged between the tracks, which each form a pair of tracks having a roller track and a corresponding (and complementary) counter track. The point or the surface of the introduction of the force of the stored energy source is arranged to be further radially inwards to the respective rocker element. Thus, a preload directed radially outwards is applied to the rolling elements via the tracks. The rolling elements are thus (when actuated according to the design) only movable in a rolling manner (about their respective rolling axis) relative to the tracks. A ramp gear is thus created. In an example embodiment, no further measure is provided for securing and/or supporting the components of the pendulum rocker damper mentioned here. In an example embodiment, a respective rolling element and at least one of the respective two tracks form a mechanical stop for axially securing the components to one another. For example, at least one of the rolling elements has a shoulder pointing radially outwards relative to its rolling axis.

The input side and the output side are defined here for better differentiation. However, this does not define the direction of a torque curve. Rather, a torque, e.g., without any difference in the transferability of a maximum torque, a maximum torsion angle and/or a transmission ratio, can be transferred in both directions in a functionally same manner between the two sides by means of the rocker elements and the stored energy source. The input side and/or the output side are formed, for example, as ring-like around the central (common) rotation axis. Radially on the inside (relative to the rotation axis), the counter tracks and, possibly, bulges for relative movability of the other components and/or at least one stop are provided, for example to prevent an excessively large relative torsion angle in the event of overloading.

Such a rocker element includes (at least) one roller track for receiving a rolling element towards the input side and (at least) one further roller track for receiving a rolling element towards the output side. Furthermore, the rocker element includes a receiving surface for an element of the stored energy source for introducing the preload force and that force which is converted by means of the tracks and rolling elements into a torque opposing the relative rotation from the input side to the output side. The preload force and the force for the desired (maximum) transferable torque are set up to act at least in part, e.g., as a whole, in the same direction. The tracks are set up in such a way that the rocker elements experience only a slight, e.g., no or negligible, relative tilting relative to one another when the input side and the output side rotate in relation to one another. In one embodiment (e.g., exclusively as a whole) two rocker elements are arranged to be opposite to one another and the stored energy source between them is solely compressed when the two sides are rotated relative to one another and not tilted relative to one another or tilted negligibly relative to one another. Irrespective of the previously explained embodiment, in an example embodiment the resultant force on the rolling elements of the pendulum rocker damper is always aligned to be perpendicular to the tangent (aligned in the direction of the track) of the contact line just adjacent to the respective track.

It is proposed here that such a rocker element includes three separate partial tracks which are arranged to be axially offset relative to one another. For example, a (single) roller track (for example the output-side one) is formed from two of the partial tracks. A (single) second roller track (for example the input-side one) is formed from the third partial track. The first and second partial tracks may be arranged axially on the outside and the third partial track may be arranged axially between the other two partial tracks. In an example embodiment, partial counter tracks corresponding to the partial tracks are formed on the sides, specifically two partial counter tracks where one (single) partial track is provided, and one (single) partial counter track where two partial tracks are provided. For example, the input side includes an input-side counter track, which is formed from a (single) partial counter track and is in rolling contact with the input-side second running surface of the input-side rolling element. There, the rocker element includes an input-side roller track which is formed from two partial tracks and is in rolling contact with the corresponding input-side first running surfaces of the input-side rolling element. For the output side, it may be exactly the opposite, i.e., the output-side rolling element is supported in a rolling manner axially-centrally on the output-side roller track of the rocker element and axially on the outside by two partial counter tracks on the output-side counter track of the output side.

With such a pendulum rocker damper, the energy is converted into an individually adaptable transfer characteristic (torque to relative torsion angle) by the rolling elements. Because there is pure rolling and therefore no friction in the rolling contact of the rolling elements, there is virtually no hysteresis. The roller tracks and complementary counter tracks make it possible to achieve any transfer characteristic in a modular manner without replacing the stored energy source.

In an example embodiment, each rolling element is supported in the direction of the rolling axis on the outside on an equilateral running surface against a tilting moment transverse to the rolling axis. An equilateral running surface is formed on the output side, on the input side, or on the corresponding rocker element. The (e.g., one-piece) other running surface is arranged between the two outside supporting running surfaces and is supported accordingly on the antagonistic component, i.e., (in the corresponding order as mentioned above) on the corresponding rocker element or on the output side or input side, respectively. On the rocker element side, such a tilting moment may be counter-supported by the stored energy source, e.g., by the same element that generates the preload force or contributes to this preload force.

In an example embodiment, the pendulum rocker damper proposed here is not used in a rotating shaft, but statically with only one-sided or two-sided torsional deflections about the rotation axis of the pendulum rocker damper, such as in a vehicle suspension, for example a roll stabilizer, as a damper device, a flap damper, for example of a trunk lid or hood, or for providing a latching function for a vehicle door.

It is also proposed in an example embodiment of the pendulum rocker damper that the input-side roller tracks and the output-side roller tracks are each arranged on the rocker elements radially on the outside.

For a compact design, the rocker element is designed to be open radially outwards (i.e., towards the respective side and/or away from the stored energy source). The rolling elements can be placed on the associated roller track from the outside, i.e., in a radial direction relative to their respective rolling axis. Nevertheless, in one embodiment, the rolling elements are pushed in axially to their rolling axis during assembly. It should be pointed out that, in this embodiment, all existing roller tracks are arranged to be radially on the outside (i.e., away from the center of the stored energy source and/or the balance of forces and/or an axis of symmetry of the pendulum rocker damper). No roller track is arranged within the rocker element or arranged to be pointing towards the stored energy source. The existing (complementary) counter tracks are thus also all arranged to be pointing radially inwards, e.g., radially-inwardly of the sides formed as ring-like. For a compact design, the sides are also designed to be open radially inwards (i.e., towards the respective rocker element or towards the stored energy source). One side may have an axial extent that extends from one (maximum) end of the rolling elements to an opposite (maximum) end of the rolling elements or is shorter or protrudes beyond. In one embodiment, at least one of the sides is axially connected to a further element or formed in one piece, which, outside of an axial overlap, overlaps with one of the rolling elements with the rocker elements and/or the stored energy source towards the center (of the stored energy source and/or the balance of forces and/or an axis of symmetry) of the pendulum rocker damper (in the case of ring-like sides in the radial direction). In one embodiment, an axial overlap at the level of a rocker element and/or a stored energy source is formed solely in a region outside of the movable elements (or their movement track), for example by a connecting bolt between two partial elements on one of the two sides. In the case of sides formed as ring-like, the rocker elements (for example as a pair) form two circle segments within a circle enclosed by the sides. Installation space exists for the stored energy source within the enclosed circle minus the circle segments of the rocker elements. This stored energy source may be set up in such a way that the central installation space is completely filled (by an envelope, for example a cylindrical shape in the case of a helical spring with a straight spring axis).

It is also proposed in an example embodiment of the pendulum rocker damper that the input side and the output side are arranged to be axially adjacent to one another, and the input side and/or the output side may have two separate partial elements.

With this embodiment, a radially compact design can be achieved. For example, the outer circumference of the input side and the output side is (approximately or exactly) the same. In one embodiment, the inner circumference, i.e., the extension towards the rocker elements, of the input side and the output side is (approximately or exactly) the same, and the arrangement of the respective counter tracks is mirrored in a symmetrical embodiment, for example, due to the opposite torsion angle. In one embodiment, the input side and the output side are identical in construction (possibly apart from the installation length in the axial direction). In one embodiment, the input side axially overlaps the output side or vice versa, so that the overlapping input side or the output side is supported relative to the rotation axis and can be supported at an axial distance which corresponds to (and is possibly slightly less than) the installation length of the pendulum rocker damper. This creates a high level of rigidity against a tilting moment transverse to the rotation axis. In one embodiment, three or more separate roller tracks are provided on the rocker element and a corresponding number of separate counter tracks on the sides, as well as separate running surfaces on the rolling elements.

In an example embodiment, one of the sides, for example the output side, is formed in pairs with two separate partial elements which are arranged to be axially adjacent to the respective other side, then for example the input side. In one embodiment, the two separate partial elements are not connected to one another but merely functionally form the respective side together, which is assigned thereto via the gear connection of the rolling elements and the rocker elements. The two partial elements therefore always move synchronously with one another. As an alternative to a separate mode of operation, a connection (e.g., by means of spacer bolts) is formed between the two partial elements of the relevant side radially outside of the core diameter (in which the rocker elements are arranged) of the pendulum rocker damper or within this core diameter. The embodiment with a connection within the core diameter is advantageous for small relative torsion angles.

It is also proposed in an example embodiment of the pendulum rocker damper that the stored energy source includes at least one helical compression spring with a straight spring axis. The spring axis may be arranged so as to extend between the input-side rolling elements and the output-side rolling elements.

This embodiment allows for a cost-effective design and a small number of separate structural components. The helical compression spring is likewise set up by means of the rocker elements to exert a minimal preload for the rolling elements, to provide support against a tilting moment transverse to the rotation axis of the pendulum rocker damper, and (the main function) to provide the desired counterforce against a relative rotation of the input side and the output side against one another. In an example embodiment, two rocker elements are arranged to be diametrically opposite one another and the one or more helical compression springs are aligned to have their (respective) spring axis parallel to the shortest distance between the two rocker elements. The ramp gear formed causes an increasing compression of the helical compression spring with an increasing torsion angle between the input side and the output side, which generates an increasing counterforce (proportional to displacement). A helical compression spring exhibits low energy dissipation and can be designed against overloading in a simple manner, for example designed to be safe against breakage up to an on-block load and/or the maximum spring deflection can be limited by means of a stop (for example on the rocker elements). A helical compression spring can also be produced inexpensively with a precisely adjusted displacement-force characteristic (for example compared to a rubber-elastic block of material), or is available on the market as a standard part and is not subject to any signs of aging that must be taken into account over a sufficiently long service life. A limit load for a helical compression spring is also easy to take into account in terms of design, for example by means of a maximum spring deflection up to an on-block load.

In one example embodiment, the spring axis of the at least one helical compression spring is arranged between the (e.g., two) rolling elements of the respective rocker element, e.g., approximately (e.g., deviating by no more than 3 mm [three millimeters]) or exactly in the middle, for example intersecting the rotation axis or with a small offset (of, for example, a maximum of ±0.5 mm [plus/minus half a millimeter]). In one embodiment, two or more helical compression springs are arranged to be nested within one another, for example with the same spring axis. One of the two helical compression springs may guide the other helical compression spring and only one of the two helical compression springs may be mounted transversely to the spring axis. In one embodiment, one of the helical compression springs at its relaxed length is shorter than the shortest distance (at a torsion angle of zero) of the rocker elements supported against one another by means of the stored energy source. Only at a predetermined torsion angle of the two sides against one another are both rocker elements brought into force-transferring contact with this (short) helical compression spring. This also creates a (stepped) increase in rigidity over the transfer characteristic of the pendulum rocker damper and/or forms a safeguard against an on-block load or overloading of the other (long and permanently in force-transferring contact) helical compression spring. Such a short helical compression spring can also be combined with another embodiment of a stored energy source element.

A pendulum rocker damper having at least one helical compression spring as a stored energy source in the central position allows for a high wire thickness, which means a high amount of energy. This amount of energy is converted by the rolling elements into an individually adaptable transfer characteristic. Because there is pure rolling and therefore no friction in the rolling contact, there is virtually no hysteresis. The stiffness of the helical compression spring varies very little. This ensures a high quality of the insulation over the service life. The roller tracks and complementary counter tracks make it possible to achieve any characteristic in a modular manner without replacing the helical compression spring.

It is further proposed in an example embodiment of the pendulum rocker damper that the wire diameter of at least one of the helical compression springs deviates by less than 20% from a roller diameter of the rolling elements at a running surface, e.g., the wire diameter is more than 5% larger than the roller diameter. The wire diameter may be larger than 5 mm and the core diameter, which is formed from the outer circumference of the rocker elements, may be than 80 mm, e.g., less than 40 mm.

The pendulum rocker damper proposed here has a helical compression spring with a high level of stiffness compared to its overall dimensions or its transferable torque. In an example embodiment, the helical compression spring is the only force-transferring element at a maximum transferable torque (by design), i.e., no parallel structure (such as a stop and/or an additional stored energy source element) is provided. For example, a maximum torque of 1.5 kNm [one and a half kilonewton meters] can be transferred via the helical compression spring, wherein a maximum spring force of, for example, 5 kN [five kilonewtons] to 30 kN [thirty kilonewtons] is applied to the helical compression spring and the helical compression spring still has free spring deflection capacities, so is not loaded up to block.

In an example embodiment, the core diameter of the pendulum rocker damper is less than 80 mm [eighty millimeters], e.g., less than 40 mm [forty millimeters]. The outer diameter of the pendulum rocker damper or the components described here may be less than 100 mm [one hundred millimeters], for example around 60 mm [sixty millimeters]. The core diameter is defined by the outer circumference of the rocker elements in the installation situation, and the core diameter corresponds to the diameter of a circle around the rotation axis, which is arranged tangential to the maximum radial extent (outward) of the rocker elements. Alternatively, the core diameter is the diameter of a circle through the rolling axes of the radially outermost (e.g., all) rolling elements in the installation situation. The installation situation is a state without a torsion angle between the input side and the output side. The wire diameter of at least one of the helical compression springs may be greater than 5 mm [five millimeters], and the wire diameter may be approximately 10 mm [ten millimeters]. A roller diameter of the rolling elements is then, for example, 9.5 mm [nine and one half millimeters] with a deviation of −5% [minus five percent] from the wire diameter. In one embodiment, the axial installation length of the pendulum rocker damper is less than 100 mm [one hundred millimeters], e.g., around 50 mm [fifty millimeters]. The rolling elements may be axially just as long as or slightly shorter than the axial installation length of the pendulum rocker damper.

It is also proposed in an example embodiment of the pendulum rocker damper that at least one of the rocker elements has a depression in its receiving surface for receiving at least one, e.g., the inner one, of the helical compression springs.

The depression provides secure guidance for the helical compression springs. In contrast to a nose, the depression allows a longer design of the helical compression spring to be received, and thus a greater spring deflection capacity and/or spring stiffness. The depression may also be beneficial when the rocker element is manufactured by means of casting or sintering for reliable molding. In an example embodiment, only the inner (or innermost) helical compression spring is received by means of the depression. The (one or more) other helical compression springs may be guided solely by the helical compression spring guided by means of the depression. In one embodiment, the helical compression springs are designed in such a way that they do not contact one another when they are functioning as designed. Alternatively, they only contact when a limit load is reached, for example when at least one of the helical compression springs is subjected to an on-block load. In one embodiment, friction between the helical compression springs is desired from a predetermined load, so that energy dissipation occurs. This energy dissipation occurs, for example, only in the outer limit range of the relative torsion angle and not at a zero crossing. In the zero crossing, the hysteresis is thus (almost) zero. Nevertheless, a safety limit and/or an increase in the counterforce or the counter torque can be generated at a large torsion angle (compared to the maximum torsion angle according to the design).

It is also proposed in an example embodiment of the pendulum rocker damper that a maximum relative torsion angle between the input side and the output side is less than 10° [ten degrees], e.g., less than 5° [five degrees].

While in the case of previously known pendulum rocker dampers for use in a drive train in a rotating shaft system, maximum torsion angles of ±20° [plus/minus twenty degrees from 360°] to ±30° [plus/minus thirty degrees] with a low rigidity of 200 Nm [two hundred Newton meters] to 300 Nm [three hundred Newton meters] are required, a high rigidity (as already mentioned above) of about 1.5 kNm [one and a half kiloNewton meters] with a low torsion angle of, for example, less than ±10° [plus/minus ten degrees], or even less than ±5° [plus/minus five degrees], for example ±3° [plus/minus three degrees] to ±4° [plus/minus four degrees], is provided here. Such a pendulum rocker damper can be used, for example, for a roll stabilizer without further measures as the only damper device in the torque flow. Depending on the installation space and mass or forces on such a roll stabilizer, other values can be achieved. In addition, a transmission curve (almost) free of hysteresis properties can be achieved so that, for example, there is a unique and, for example, soft transfer characteristic for small torsion angles (for example in a motor vehicle when driving over an uneven roadway) and for large torsion angles there is a unique and, for example, hard transfer characteristic (for example in a motor vehicle when cornering with high lateral acceleration). When driving over a pothole, a low torque occurs on the roll stabilizer because only the weight of the wheel assembly has an effect. With the low rigidity of the transfer characteristic (corresponding to the low torque), these are then not passed on to the other wheel on the wheel axle, or are passed on with heavy damping. When cornering, the entire vehicle mass is accelerated (transversely) to the outside of the curve so that higher torques then occur on the roll stabilizer. These are then passed on to the other wheel with the high rigidity of the transfer characteristic (corresponding to the high torque).

It is also proposed in an example embodiment of the pendulum rocker damper that, by means of the roller tracks and the counter tracks at a maximum relative torsion angle according to the design between the input side and the output side, a maximum spring deflection of the stored energy source of about 1 mm [one millimeter] to 10 mm [ten millimeters], for example up to a maximum of 6 mm [six millimeters], is effected.

The spring deflection of the stored energy source should be small to be able to achieve a high degree of compactness of the pendulum rocker damper. For some applications, a high (maximum) rigidity of the pendulum rocker damper is also required with a low maximum torsion angle (as mentioned above, for example). Because of the tracks for the rolling elements, i.e., the ramp gear, such a relationship can be achieved and also individually adapted to the requirements with a characteristic curve that is required in each case. In an example embodiment, a stored energy source that is the same in construction or that has been modified only slightly can be used for different transfer characteristics. Only the geometry of the ramp gear must be adapted. Alternatively, only the stored energy source must be replaced to achieve a desired transfer characteristic with the same properties but different forces or torques. The required installation space may be always the same, with any necessary changes to the stored energy source and/or the ramp gear. This means that the pendulum rocker damper can be used for a large number of different vehicles with different masses and/or, in the course of development, can still be adapted at a later date without any major effort, as well as can be used for many different applications.

According to a further aspect, a roll stabilizer is proposed for a wheel axle of a motor vehicle. The roll stabilizer has at least one wheel spring connection, and at least one pendulum rocker damper, e.g., according to an embodiment according to the above description. The at least one wheel spring connection is connected to the pendulum rocker damper in a torque-transferring manner. The pendulum rocker damper has an input side, an output side, a plurality of rocker elements, a corresponding number of rolling elements and a stored energy source. The rolling elements are clamped rollably by means of the stored energy source between roller tracks of the rocker elements and counter tracks of the input side or output side. An actuator, e.g., a multi-stage planetary gear, may be provided in the torque flow between the actuator and the pendulum rocker damper. The at least one wheel spring connection is connected to the actuator by means of the pendulum rocker damper in a torque-transferring manner.

A roll stabilizer in a classic embodiment is arranged between a first wheel spring, for example connected via a first torsion bar, and a second wheel spring, for example connected via a second torsion bar, and is set up to modulate the transfer of a compression force or rebound force of the two wheels of a (common) wheel axle, for example with a MacPherson strut on a (e.g., steered) front axle. The spring struts or torsion bars are each connected in a force-transferring manner to the wheel mount for one wheel of the common wheel axle. In a non-modulated and passive embodiment of a roll stabilizer, the two torsion bars are connected to one another or formed in one piece. In the roll stabilizer described here, a torque transfer is directed from one wheel spring to the other wheel spring by means of the respective wheel spring connection via the pendulum rocker damper. The pendulum rocker damper is interposed to dampen or suppress the transfer of up and down movements of one of the two wheels (e.g., due to uneven ground) to the other wheel of the common wheel axle.

In an active embodiment of the roll stabilizer, an actuator is further provided. The actuator is an electric machine, for example. The actuator may be supplied with the required power voltage from outside the roll stabilizer, for example from the on-board power supply of a motor vehicle. In one embodiment, the controller and/or the required sensor system for the actuator are integrated into the roll stabilizer. In one embodiment, a separate roll stabilizer is provided for each wheel, so that only one wheel spring connection is provided in each case. This wheel spring connection is connected to the actuator by means of the pendulum rocker damper. Any compression or rebound of the wheel connected in a torque-transferring manner is registered by a sensor system. The determined values are sent purely electronically to the actuator of the respectively other roll stabilizer on the common wheel axle, and the actuator there generates a torque for transfer to the wheel spring connection there.

For good response behavior and to reduce rattling noises in the roll stabilizer, the use of a pendulum rocker damper may be advantageous, which provides the desired damping by means of its ramp gear. Rattling noises lead to uncertainty in the vehicle driver, especially when encountering uneven ground, which can trigger these noises. The pendulum rocker damper may be the only damper device in the torque flow between the two wheel spring connections or between the actuator and the wheel spring connection or the wheel spring connections. The pendulum rocker damper is formed without a rubber-elastic damper element. The pendulum rocker damper includes a plurality of rocker elements, a corresponding number of rolling elements and a stored energy source, and a ramp gear is formed by the rocker elements on the input side and/or the output side. The torque directed against a rotation of the input side against the output side is applied by the stored energy source, which may include at least one helical compression spring, e.g., may only include the at least one helical compression spring. The rolling elements are clamped rollably between roller tracks of the rocker elements and counter tracks of the input side or output side by means of the stored energy source.

The pendulum rocker damper is designed, for example, like an embodiment of the previously known pendulum rocker damper mentioned at the outset. The pendulum rocker damper can be designed in such a way that a hysteresis property is low to negligible. The occurrence of rattling noises in the roll stabilizer can thus be effectively avoided or reduced to a sufficient extent. In an example embodiment, the pendulum rocker damper is designed according to an embodiment according to the above description. The latter provides the advantage of being compact, and requiring less installation space than previously known rubber-elastic damper devices which are used in conventional roll stabilizers, for example. In addition, such a pendulum rocker damper can be produced inexpensively and flexibly adapted to a wide variety of requirements without the installation space required having to be changed for this purpose.

In an example embodiment, a multi-stage planetary gear is interposed in the torque flow between the actuator and the pendulum rocker damper in an active roll stabilizer. An inexpensive and compact actuator can thus be used, which has a (too) low maximum torque for (transmission-free) use in a roll stabilizer. The multi-stage planetary gear enables a large transmission ratio in a small installation space. In one embodiment, a three-stage planetary gear is provided.

According to a further aspect, a motor vehicle is proposed. The motor vehicle has a drive engine, at least one wheel axle and at least one roll stabilizer according to an embodiment according to the above description on at least one of the wheel axles.

The mass of motor vehicles is becoming increasingly problematic, both in what are termed sport utility vehicles [SUVs] and in the electrified motor vehicles with a large traction battery. In addition, the demand for high driving safety is increased, which includes, for example, good roll stabilization on paved roads for precise cornering and for a high level of ride comfort (and thus an increased feeling of safety). At the same time, due to the complexity of today's motor vehicles and the increasing lack of understanding of what is happening in the motor vehicle while driving, the sensitivity of vehicle drivers to the development of (unknown) noises is high.

In the motor vehicle proposed here, an active roll stabilizer with a compact pendulum rocker damper and rattle-free operation in all operating states is proposed. The roll stabilizer can be designed in the same or smaller size compared to a previously known roll stabilizer with a rubber-elastic damper device and can therefore be used as a substitute for a previously known roll stabilizer in the motor vehicle, for example it can also be replaced in a maintenance cycle if problems arise with the conventional roll stabilizer, for example due to signs of aging.

Passenger cars are assigned to a vehicle category according to, for example, size, price, weight, and performance, wherein this definition is subject to constant change based on the needs of the market. In the US market, the J-segment (SUV) of vehicles according to the European classification is assigned to the Mini SUV to Full-size SUV segments, and in the British market they correspond to the 4×4 segment or the Coupe SUV segment. Examples of the Mini SUV segment are the Dacia Duster and the Opel Mokka. Examples of the Large 4×4 segment are the Porsche Cayenne, the Mercedes-Benz M-Class and the Ford Explorer. A well-known all-electric SUV is the Tesla Model X.

BRIEF DESCRIPTION OF THE DRAWINGS

The disclosure described above is explained in detail below against the pertinent technical background with reference to the accompanying drawings, which show example embodiments. The disclosure is in no way restricted by the purely schematic drawings, wherein it should be noted that the drawings are not dimensionally accurate and are not suitable for defining proportions. In the figures.

DETAILED DESCRIPTION

Figure 1:
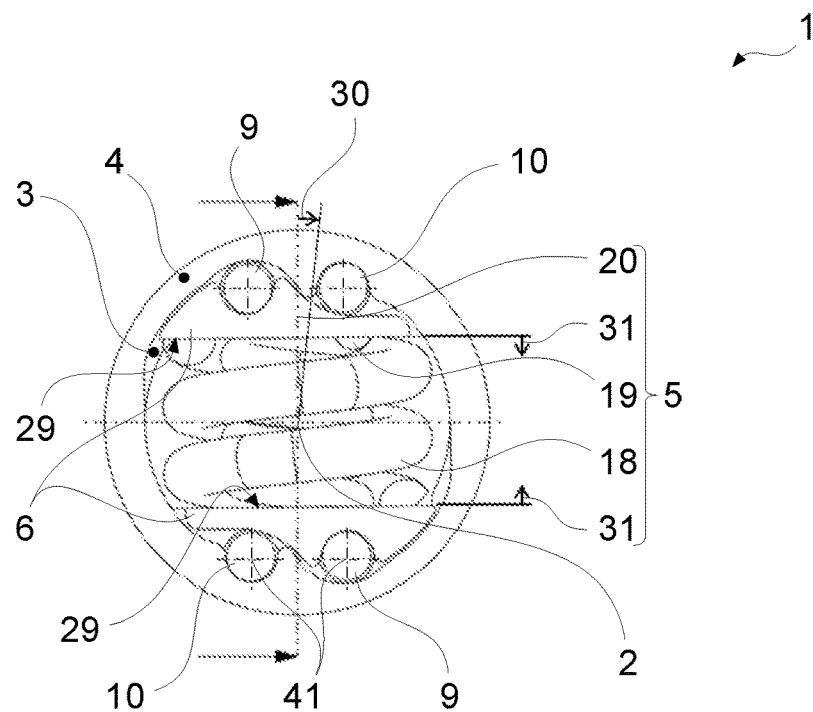
FIG. 1 shows a pendulum rocker damper in a front view.

FIG. 1 shows a front view of a pendulum rocker damper 1, by means of which a torsion angle 30 about the central rotation axis 2 between a (here ring-like) input side 3 (here covered, cf. FIG. 2 and FIG. 3) and a (here also ring-like) output side 4 about a central rotation axis 2 is converted into a straight spring deflection 31 along the spring axis 20. This is accomplished by means of a ramp gear, which in this embodiment is formed by two diametrically opposed rocker elements 6 or by means of their roller tracks 7, 8, counter tracks 11, 12 (on the input side 3 and output side 4), and the rolling elements 9, 10 arranged in between (cf. FIG. 3). The roller tracks 7, 8 of the rocker elements 6 point radially outwards and in this embodiment the input side 3 and the output side 4 are arranged to be radially on the outside with respect to the rocker elements 6. It should be noted that as a result of a torsion angle 30 (not equal to zero) between the input side 3 and the output side 4, the rocker elements 6 tilt out of the rest position shown relative to the sides 3, 4. However, the rocker elements 6 remain (at least almost) aligned with respect to one another along the spring axis 20, that is to say perpendicular thereto, or describe a slight lateral offset of the receiving surfaces 29 with respect to one another. The rocker elements 6 move towards one another, as shown by the indicated spring deflections 31, in case of an applied torsion angle 30 (not equal to zero).

The rolling elements 9, 10 are pressed against their respective roller track 7, 8 and their respective counter track 11, 12 by means of the stored energy source 5 in such a way that only a rolling movement as a relative movement between the respective rolling element 9, 10 and the rocker element 6 and the relevant side 3, 4 is possible. A slipping movement without rotation about the rolling axis 41 (designated here for the sake of clarity only in the case of the lower rolling elements 9, 10 according to the illustration) of the respective rolling element 9, 10 is excluded when the pendulum rocker damper 1 is operated as designed. In this embodiment, the stored energy source 5 comprises an outer helical compression spring 18 and an inner helical compression spring 19 which have a common spring axis 20. The spring axis 20 is arranged to be perpendicular to the receiving surfaces 29 of the rocker elements 6 and the preload force of the helical compression springs 18, 19 is thus directed perpendicularly into the rocker elements 6. The spring axis 20 intersects the rotation axis 2 or is arranged slightly offset from the rotation axis 2. The preload force of the stored energy source 5 is then introduced via the respective roller tracks 7, 8 into the associated rolling element 9, 10, and from this in turn into the associated counter track 11, 12 of the relevant side 3, 4. In an example embodiment, such a stable balance of power is created that the force on a rolling element 9, 10 is directed (at least approximately) perpendicular to the tangent (in the direction of the track) of the current contact line with the respective track 7, 8, 11, 12 in each case. The force then runs diametrically (i.e., intersecting the rolling axis 41) through the rolling elements 9, 10.

Figure 2:
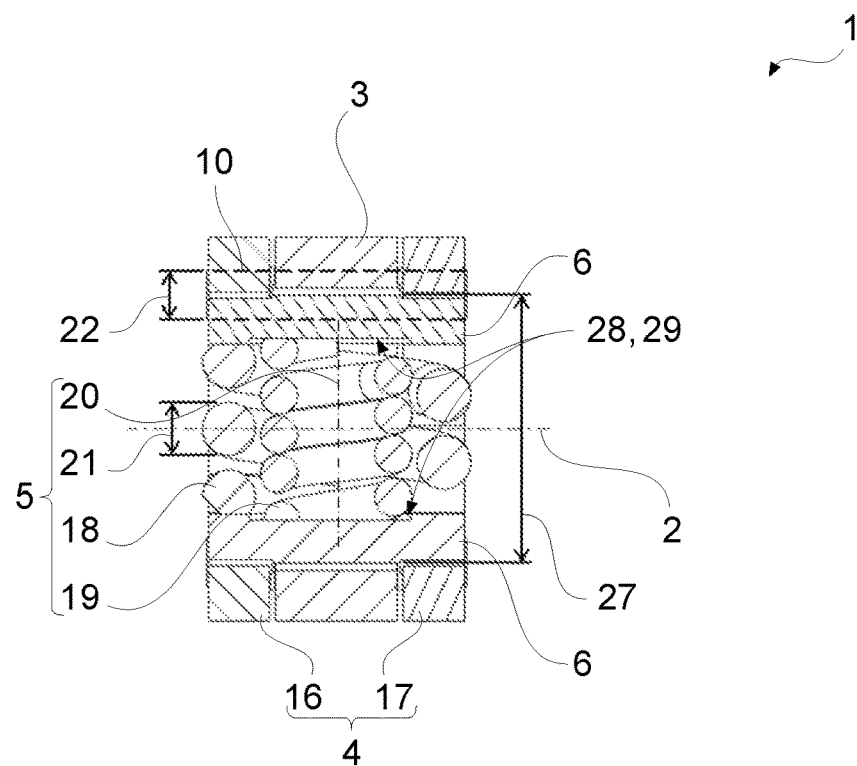
FIG. 2 shows the pendulum rocker damper according to FIG. 1 in a sectional view.

In FIG. 2, the pendulum rocker damper 1 according to FIG. 1 is shown in a sectional view, as it is indicated there. At the top of the illustration, the (output-side) rolling element 10 is shown in simplified form with a dashed line, on the opposite side (below), an (input-side) rolling element 9 is largely covered, and therefore not indicated here (cf. FIG. 1). Here it is easy to see how the two helical compression springs 18, 19 with a common spring axis 20 are arranged to be one inside the other between the receiving surfaces 29 of the rocker elements 6 and are thus clamped to generate the preload force and the torque opposing the relative rotation. The wire diameter 21 of the outer helical compression spring 18 is slightly larger than the (effective) roller diameter 22 of the rolling elements 9, 10. The sides 3, 4 are arranged to be radially on the outside, which here are formed in a ring-like manner as a (one-piece) input side 3 in the axial center and as an output side 4 having a first partial element 16 and a second partial element 17, in each case axially adjacent to the input side 3.

A torque that is applied via the input side 3 runs via the input-side rolling elements 9, via the rocker elements 6 and again via the output-side rolling elements 10 to the output side 4. A (rocking) movement of the rocker elements 6 generated in this way opposes the spring force of the stored energy source 5 (cf. spring deflection 31 in FIG. 1). To guide or hold the helical compression springs 18, 19 against transverse forces, a depression 28 is (optionally) provided in the receiving surfaces 29 of the rocker elements 6 in this embodiment. One end each of the inner helical compression spring 19 is received in these depressions 28. The inner helical compression spring 19 guides the outer helical compression spring 18 over its outer cylinder circumference. A core diameter 27 is formed radially inside the ring-like sides 3, 4, which corresponds to the (maximum) outer circumference of the rocker elements 6 in the installation situation shown. The core diameter 27 is small (it measures, for example, about 40 mm [forty millimeters]) and yet in case of relative torsion of the input side 3 to the output side 4 about the rotation axis 2, a maximum torque of 1.5 kNm [one and a half kilonewton meters] or more can be attained. For example, the maximum torsion angle 30 (by design) is less than ±6° [plus/minus six degrees].

Figure 3:
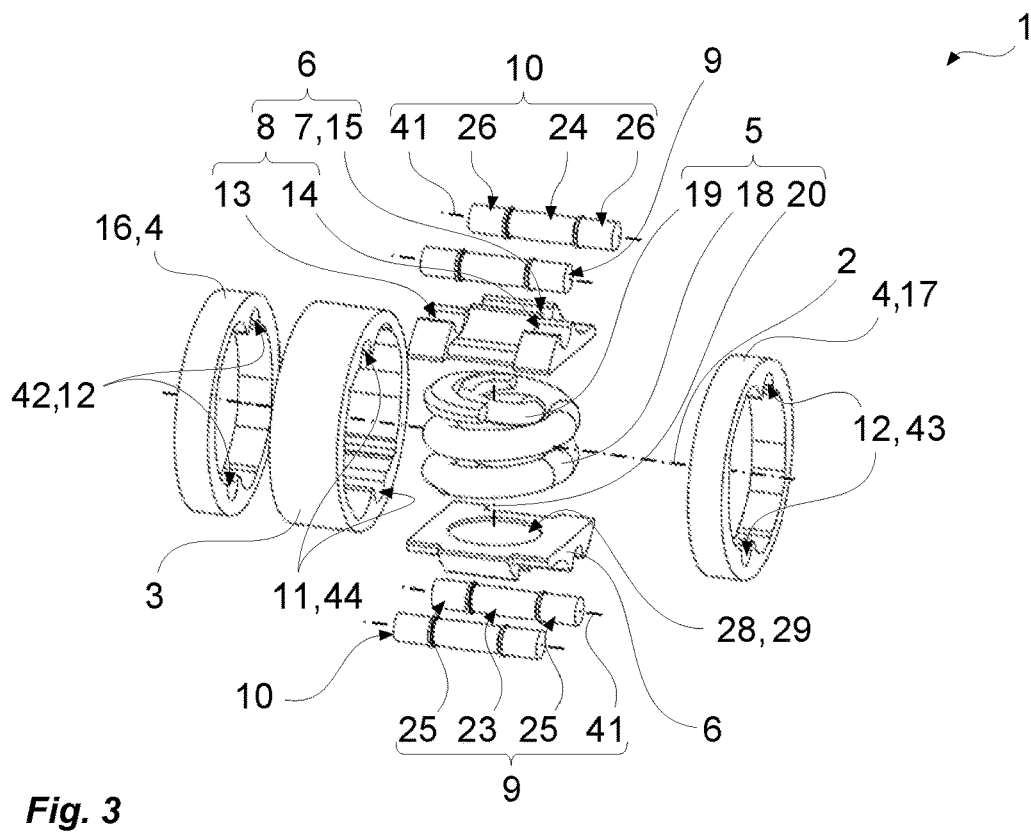
FIG. 3 shows an exploded view of the pendulum rocker damper according to FIG. 1 and FIG. 2.

FIG. 3 shows an exploded view of the pendulum rocker damper 1 according to FIG. 1 and FIG. 2. In addition to the components of the pendulum rocker damper 1 already explained, the tracks are clearly visible here.

On the (according to the illustration) upper rocker element 6, a two-part, output-side roller track 8 can be seen at the front and an axially central, input-side roller track 7 can be seen at the rear. The same applies to the lower rocker element 6, which is rotated about the rotation axis 2 and may be identical to the upper rocker element 6. The output-side roller tracks 8 are thus formed from the first partial track 13 and the second partial track 14 in each case, which are arranged to be axially on the outside. The input-side roller tracks 7 are formed from the third partial track 15 in each case, which is arranged to be axially central between the other two first partial tracks 13, 14.

On the axially central input side 3, two (input-side) counter tracks 11 opposite to one another can be seen. The input-side counter tracks 11 are thus formed from an (axially central) third partial counter track 44 in each case.

On the two-part output side 4, two (output-side) counter tracks 12 opposite to one another can be seen on each partial element 16, 17 in each case. The output-side counter tracks 12 are thus formed from a first partial counter track 42 (on the first partial element 16 of the output side 4) and a second partial counter track 43 (on the second partial element 17 of the output side 4) in each case, namely axially on the outside relative to the third partial counter track 44.

And, furthermore, the corresponding running surfaces can also be seen on the rolling elements 9, 10:

On the input-side rolling element 9 (according to the illustration, the front one at the top and the rear one at the bottom), the input-side second running surface 23 for rolling on the output side counter track 11 (third partial counter track 44) can be seen axially centrally and an output side first running surface 25 for rolling on the input-side roller track 8 (first partial track 13 and second partial track 14) can be seen axially on the outside in each case. Optionally, the running surfaces 23, 25 of the input-side rolling element 9 are separated from one another by means of a shoulder here, thus creating an axial bearing arrangement or safeguard.

On the output-side rolling element 10 (according to the illustration, the front one at the bottom and the rear one at the top), the output-side first running surface 24 for rolling on the output-side roller track 8 (third partial track 15) can be seen axially centrally and an output-side second running surface 26 for rolling on the output-side counter track 12 (first partial counter track 42 and second partial counter track 43) can be seen axially on the outside in each case. Optionally, the running surfaces 24, 26 of the output-side rolling element 10 are also separated from one another by means of a shoulder here, thus creating an axial bearing arrangement or safeguard.

Furthermore, the depression 28 in the receiving surface 29 of the lower rocker element 6 according to the illustration can be clearly seen here in FIG. 3. As can already be seen in FIG. 2, in this embodiment, the depression 28 is designed to receive the inner helical compression spring 19 and the region of the receiving surface 29 around the depression 28 is designed to receive the outer helical compression spring 18.

Figure 4:
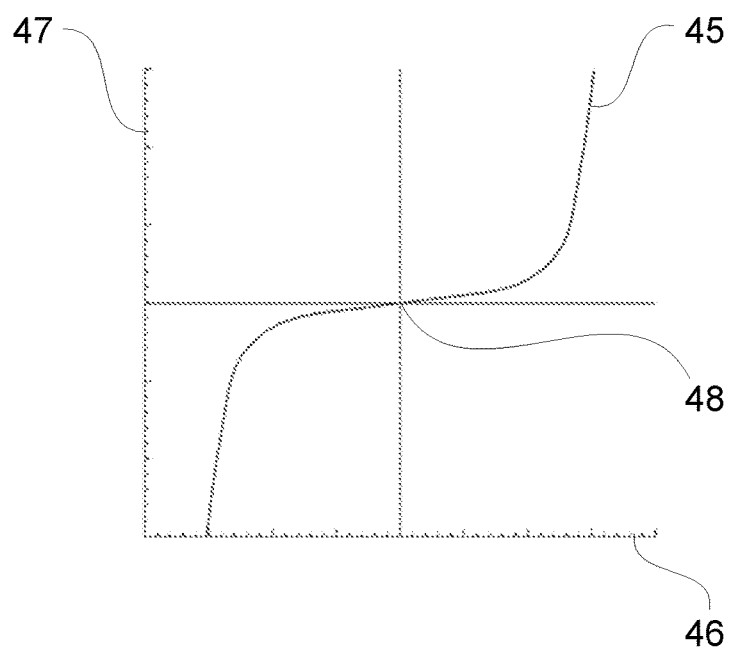
FIG. 4 shows an achievable transfer characteristic.
Figure 5:
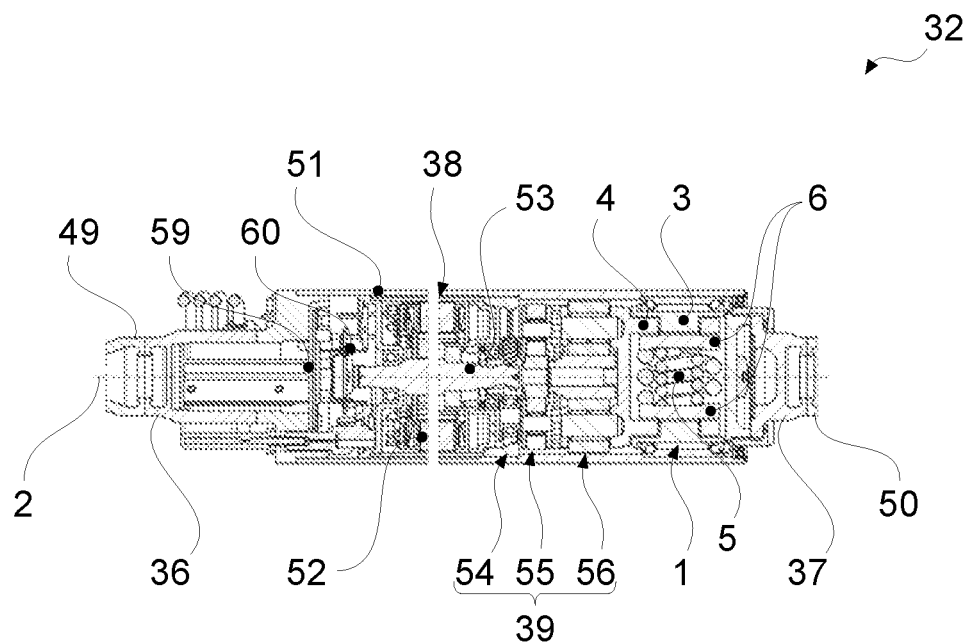
FIG. 5 shows an active roll stabilizer with a pendulum rocker damper according to FIG. 1 to FIG. 3.

FIG. 4 shows a transfer characteristic 45 that can be achieved by means of a pendulum rocker damper 1 (for example as shown in one of FIG. 1 to FIG. 3). Such a transfer characteristic 45 is useful for a roll stabilizer 32 (for example as shown in FIG. 5). The abscissa 46 is plotted in degrees, for example from −6° to +6°. The ordinate 47 is plotted in kilonewton meters, for example from −1.5 kNm to +1.5 kNm. The transfer characteristic 45 is flat and approximately straight around the zero crossing 48 (that is to say with an approximately constant gradient). This achieves a soft response behavior with small torsion angles 30. From a predetermined torsion angle 30, for example −4° or +4°, a sudden but constant transition to a steep and also approximately straight gradient (i.e., a rapid increase in rigidity) is formed. Within a small range of the torsion angle 30 (for example from +4° to +6° or −4° to −6°), the torsional rigidity is increased tenfold (or more) (for example from about 0.15 kNm to 1.5 kNm). It should be pointed out that the transfer characteristic 45 can be set as desired within wide limits. In addition, with an appropriate design, a hysteresis of the transfer characteristic 45 is negligible, as shown. For example, a hysteresis at the zero crossing 48 is less than 0.5 Nm [half a newton meter].

FIG. 5 shows an example of an active roll stabilizer 32 with a pendulum rocker damper 1 according to FIG. 1 to FIG. 3. The roll stabilizer 32 has a left wheel spring connection 36 for, for example, a left torsion bar 49 (shown in sections) and a right wheel spring connection 37 for, for example, a right torsion bar 50 (shown in sections). The side designation is arbitrary and chosen here without exclusion of generality according to the representation. Via a housing 51, the left wheel spring connection 36 is connected in a torque-transferring manner via its stator 52 to the actuator 38, which is designed as an electric machine. The rotor 53 of the actuator 38 is connected via a planetary gear 39, which includes a first planetary stage 54, a second planetary stage 55 and a third planetary stage 56 connected in series, to the output side 4 of the pendulum rocker damper 1 in a torque-transferring manner. The input side 3 of the pendulum rocker damper 1 is, in turn, connected to the right wheel spring connection 37 in a torque-transferring manner.

A torque-transferring connection between the left wheel spring connection 36 and the right wheel spring connection 37 is thus formed exclusively via the actuator 38, the planetary gear 39, and the pendulum rocker damper 1. In this way, on the one hand, a torque transfer is damped by means of the pendulum rocker damper 1, for example according to the transfer characteristic 45 as shown in FIG. 4, and/or modulated. On the other hand, small torque deflections and the result of a hysteresis property of a conventional damper device are kept away by the planetary gear 39 and the actuator 38. A torque can also be generated by means of the actuator 38, so that a greater (opposite) torque can be transferred to the two wheel spring connections 36, 37 than is induced by the causative wheel 57, 58 (or torsion bar 49, 50). The actuator 38 is controlled here by means of an internal sensor system, here for example a magneto-elastic torque sensor 59 and a rotor position sensor 60.

Figure 6:
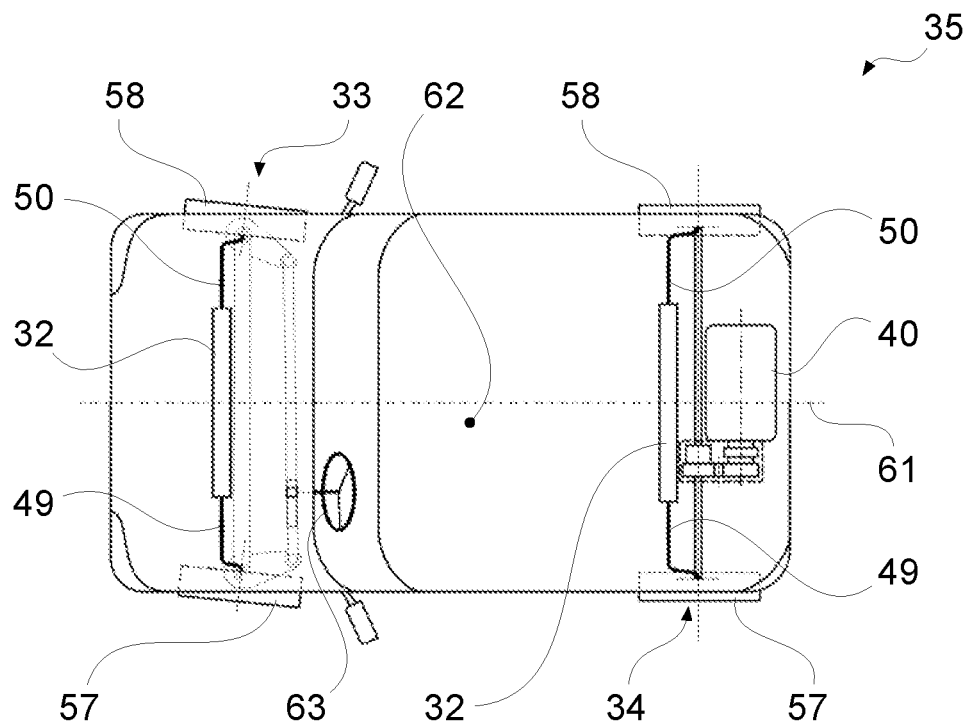
FIG. 6 shows a motor vehicle with two roll stabilizers.

In FIG. 6, a motor vehicle 35 is shown schematically in a top view with one roll stabilizer 32 each on the wheel axles 33, 34. In this motor vehicle 35 the rear wheel axle 34 (along the vehicle longitudinal axis 61) is driven by means of a (for example electric) drive engine 40. The front wheel axle 33 is (exclusively, for example) the steering axle for controlling the direction of travel of the motor vehicle 35 from the driver's cab 62 by means of the steering wheel 63. If, for example, the left wheel 57 of a wheel axle 33, 34 compresses due to cornering (to the left as indicated here), this relative upward movement of the left (i.e., outside of the curve) wheel 57 towards the body of the motor vehicle 35 is converted into a torque in the left torsion bar 49 and passed on to the roll stabilizer 32. There, the torque (optionally actively amplified) is passed on to the right (inside of the curve) torsion bar 50. The unloaded spring strut of the right wheel 58 is thus loaded and therefore forms an abutment for the loaded left wheel 57. This reduces the tendency of the motor vehicle 35 to roll. The motor vehicle 35 passes through the (left-hand) curve at a low roll rate. If, on the other hand, only uneven ground causes a wheel 57, 58 to move up and down, this resulting torque is absorbed by the pendulum rocker damper 1 or significantly reduced due to the softness. The motor vehicle 35 thus does not rock.

The pendulum rocker damper proposed here is compact and makes it possible to generate a high torsional rigidity. The roll stabilizer can be operated with reduced rattling noises.

REFERENCE NUMERALS

1 Pendulum rocker damper
2 Rotation axis
3 Input side
4 Output side
5 Stored energy source
6 Rocker element
7 Input-side roller track
8 Output-side roller track
9 Input-side rolling element
10 Output-side rolling element
11 Input-side counter track
12 Output-side counter track
13 First partial track
14 Second partial track
15 Third partial track
16 First partial element (output side)
17 Second partial element (output side)
18 Outer helical compression spring
19 Inner helical compression spring
20 Spring axis
21 Wire diameter
22 Roller diameter
23 Input-side first running surface
24 Output-side first running surface
25 Input-side second running surface
26 Output-side second running surface
27 Core diameter
28 Depression
29 Receiving surface
30 Torsion angle
31 Spring deflection
32 Roll stabilizer
33 Front wheel axle
34 Rear wheel axle
35 Motor vehicle
36 Left wheel spring connection
37 Right wheel spring connection
38 Actuator
39 Planetary gear
40 Drive engine
41 Rolling axis
42 First partial counter track
43 Second partial counter track
44 Third partial counter track
45 Transfer characteristic
46 Abscissa
47 Ordinate
48 Zero crossing
49 Left torsion bar
50 Right torsion bar
51 Housing
52 Stator
53 Rotor
54 First planetary stage
55 Second planetary stage
56 Third planetary stage
57 Left wheel
58 Right wheel
59 Magneto-elastic torque sensor
60 Rotor position sensor
61 Vehicle longitudinal axis
62 Driver's cab
63 Steering wheel

The invention claimed is:

1. A pendulum rocker damper with a rotation axis, comprising:
an input side;
an output side;
a stored energy source for transferring a torque between the input side and the output side;
a plurality of rocker elements, each comprising an input-side roller track and an output-side roller track; and
a number of rolling elements corresponding to the number of roller tracks of the rocker elements,
wherein the input side has one input-side counter track each corresponding to a respective one of the input-side roller tracks, between which one input-side rolling element each is clamped rollably by means of the stored energy source,
the output side has one output-side counter track each corresponding to a respective one of the output-side roller tracks, between which one output-side rolling element each is clamped rollably by means of the stored energy source, and
the rocker elements each comprise three separate partial tracks which are arranged to be axially offset relative to one another and from which the roller tracks are formed.

2. The pendulum rocker damper according to claim 1, wherein
the input-side roller tracks and the output-side roller tracks are each arranged on the rocker elements radially on the outside.

3. The pendulum rocker damper according to claim 1, wherein
the input side and the output side are arranged to be axially adjacent to one another, and
the input side or the output side comprise(s) two separate partial elements.

4. The pendulum rocker damper according to claim 1, wherein
the stored energy source comprises at least one helical compression spring with a straight spring axis, and
the spring axis is arranged so as to extend between the input-side rolling elements and the output-side rolling elements.

5. The pendulum rocker damper according to claim 4, wherein
a wire diameter of at least one of the helical compression springs deviates by less than 20% from a roller diameter of the rolling elements at a running surface, and
the wire diameter is larger than 5 mm and the core diameter, which is formed from the outer circumference of the rocker elements, is less than 80 mm.

6. The pendulum rocker damper according to claim 4, wherein
at least one of the rocker elements has a depression for receiving at least one of the helical compression springs.

7. The pendulum rocker damper according to claim 1, wherein
a maximum relative torsion angle between the input side and the output side is less than 10°.

8. The pendulum rocker damper according to claim 1, wherein
by means of the roller tracks and the counter tracks at a maximum relative torsion angle according to the design between the input side and the output side, a maximum spring deflection of the stored energy source of about 1 mm to 10 mm is effected.

9. A roll stabilizer for a wheel axle of a motor vehicle, having at least the following components:
at least one wheel spring connection; and
at least one pendulum rocker damper according to claim 1,
wherein the at least one wheel spring connection is connected to the pendulum rocker damper in a torque-transferring manner,
wherein a multi-stage planetary gear is provided in the torque flow between an actuator and the pendulum rocker damper, wherein the at least one wheel spring connection is connected to the actuator by means of the pendulum rocker damper in a torque-transferring manner.

10. A motor vehicle having
a drive engine, at least one wheel axle and at least one roll stabilizer according to claim 9 on at least one of the wheel axles.

11. A pendulum rocker damper with a rotation axis, comprising:
an input side comprising a first input-side counter track and a second input-side counter track;
an output side comprising a first output-side counter track and a second output-side counter track;
a stored energy source for transferring a torque between the input side and the output side;
a first rocker element disposed at a first axial end of the stored energy source, the first rocker element comprising three axially offset partial tracks forming a first input-side roller track and a first output-side roller track;
a second rocker element disposed at a second axial end of the stored energy source, opposite the first axial end, the second rocker element comprising three axially offset partial tracks forming a second input-side roller track and a second output-side roller track;
a first input-side rolling element clamped between the first input-side counter track and the first input-side roller track;
a second input-side rolling element clamped between the second input-side counter track and the second input-side roller track;
a first output-side rolling element clamped between the first output-side counter track and the first output-side roller track; and
a second output-side rolling element clamped between the second output-side counter track and the second output-side roller track.

12. The pendulum rocker damper of claim 11, wherein:
the first input-side roller track and the first output-side roller track are arranged on a radial outside of the first rocker element; and
the second input-side roller track and the second output-side roller track are arranged on a radial outside of the second rocker element.

13. The pendulum rocker damper of claim 11, wherein the input side and the output side are arranged to be axially adjacent to one another.

14. The pendulum rocker damper of claim 11, wherein the input side or the output side comprises two separate partial elements.

15. The pendulum rocker damper of claim 11, wherein the stored energy source comprises a helical compression spring having a straight spring axis.

16. The pendulum rocker damper of claim 15, wherein the straight spring axis extends between the first input-side rolling element and the first output-side rolling element.

17. The pendulum rocker damper of claim 15, wherein:
the first input-side rolling element comprises a roller diameter;
the helical compression spring comprises a wire diameter that is larger than 5 mm (five millimeters) and more than 5% (five percent) larger than the roller diameter; and
a core diameter formed from an outer circumference of the first rocker element is less than 40 mm (forty millimeters).

18. The pendulum rocker damper of claim 11, wherein:
the stored energy source comprises:
an outer helical compression spring; and
an inner helical compression spring disposed radially inside of the outer helical compression spring; and
the first rocker element comprises a depression for receiving the inner helical compression spring.

19. The pendulum rocker damper of claim 11, wherein:
a maximum relative torsion angle between the input side and the output side is less than 10° (ten degrees); and
a maximum spring deflection of the stored energy source is less than 10 mm (ten millimeters) at the maximum relative torsion angle.

* * * * *